United States Patent
Tsukuda

(10) Patent No.: US 7,782,942 B2
(45) Date of Patent: Aug. 24, 2010

(54) MOVING PICTURE CODING DEVICE

(75) Inventor: Noriaki Tsukuda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1188 days.

(21) Appl. No.: 11/388,022

(22) Filed: Mar. 24, 2006

(65) Prior Publication Data

US 2007/0140340 A1    Jun. 21, 2007

(30) Foreign Application Priority Data

Dec. 15, 2005    (JP) .............................. 2005-362140

(51) Int. Cl.
    *H04N 7/12* (2006.01)
(52) U.S. Cl. .............................. 375/240.12; 375/240.26
(58) Field of Classification Search ............ 375/240.12, 375/240.16, 240.26
    See application file for complete search history.

(56) References Cited

U.S. PATENT DOCUMENTS

2002/0168008 A1* 11/2002 Ishikawa ............... 375/240.15
2004/0136461 A1* 7/2004 Kondo et al. ........... 375/240.16
2008/0063075 A1* 3/2008 Kondo et al. ........... 375/240.16

FOREIGN PATENT DOCUMENTS

| JP | 11-298904 | 10/1999 |
|---|---|---|
| JP | 2001-298734 | 10/2001 |
| JP | 2002-16912 | 1/2002 |

* cited by examiner

*Primary Examiner*—Temesghen Ghebretinsae
(74) *Attorney, Agent, or Firm*—Staas & Halsey LLP

(57) ABSTRACT

The present invention relates to a moving picture coding device coding picture frames each having any one of a plurality of picture types, includes a pre-processing unit sequentially outputting, as a coding target frame, each of the picture frames sequentially inputted, a coding unit coding the sequentially outputted coding target frame by a predictive coding method corresponding to a picture type of the coding target frame on the basis of a coding scheme corresponding to the coding target frame, a control unit controlling, when detecting a frame interval at which the coding target frame is not outputted from the pre-processing unit, the coding unit to code a predetermined picture frame, and modifying unit acquiring coded information from coded data coded under control of the control unit, and modifying the coding scheme corresponding to the coding target frame from the coded information.

9 Claims, 10 Drawing Sheets

MOVING PICTURE CODING DEVICE

BACKGROUND OF THE INVENTION

1. Field of the Invention

The present invention relates to a moving picture coding device that predicatively codes a moving picture.

2. Description of the Related Art

Moving picture data (dynamic image data) generally has a large data size and is therefore coded at a high efficiency (high-efficiency coding) when transmitted to a receiving device from a transmitting device or when stored in a storage device. The high-efficiency coding is a coding technology of converting a certain data train into one other data train and is a technology of compressing a target data size.

MPEG (Moving Picture Experts Group) exists as the standards for the moving picture coding. The MPEG involves using three predictive coding types. Hence, an MPEG frame is structure of three types of pictures corresponding to this predictive coding type. FIG. 8 is a diagram showing a fame structure in the MPEG. As shown in FIG. 8, the MPEG frame is structured of an I-picture (Intra coded picture) (I0 in FIG. 8), a P-picture (Predictive coded picture) (P3 and P6 in FIG. 8) and a B-picture (Bidirectionally coded picture) (B1, B2, B4 and B5 in FIG. 8).

The I-picture is a fame serving as a starting point of processing and is coded by intra-frame prediction. The P-picture is coded by unidirectional motion-compensated inter-frame prediction from the I-picture or the P-picture in the past. The B-picture is coded by bidirectional motion-compensated inter-frame prediction from the I-picture or the P-picture in the past and from an I-picture or a P-picture in the future. This motion-compensated inter-frame prediction method is a coding method that utilizes such a general property of the moving picture as to have a high similarity between the frame data at a certain timing and the frame data at a next timing in the frames configuring the moving picture.

Given further as the moving picture coding method using such moving picture high-efficiency coding is a method of at first predicting the generated code quantity (data size) acquired as a result of the coding that employs a predetermined coding scheme (coding parameters etc) and statistic data representing a property of the picture, next readjusting the coding scheme on the basis of the generated code quantity and the statistic data that are thus predicted, and actually coding the target frame. This method is called a 2-path coding method in some cases.

On the other hand, according to the coding method using a single-system encoder without employing the 2-path coding system, in the case of coding the moving picture in real time, there is not generally obtained information showing how much the coding quantity occurs as a result of coding the picture at a starting time of coding the predetermined picture. Hence, the coding method using the single-system encoder has difficulty of controlling a code quantity for adjusting a designated bit rate while taking affection on a picture quality into consideration, with the result that a bias in picture quality occurs within the picture.

In the moving picture coding device using the single-system encoder, a method of yielding an effect equivalent to the 2-path coding system is proposed in order to solve such a problem (Patent document 1 given below). In this coding method, to begin with, there is generated a reduced picture with a decreased resolution of the picture that should be originally coded, and the reduced picture is coded. Then, a coding parameter is adjusted based on a coded result, the originally-should-be-coded picture accumulated in a delay buffer is coded by the adjusted coding parameter, whereby the effect equivalent to the 2-path coding is acquired by the single encoder.

Note that the following disclosed documents are given as documents of the conventional arts related to the present invention of the application in addition to those described above. The conventional art documents are "Japanese Patent Application Laid-Open Publication No. 2002-16912", "Japanese Patent Application Laid-Open Publication No. 11-298904", and "Japanese Patent Application Laid-Open Publication No. 2001-298734".

In the conventional arts described above, however, precedence coding is carried out by use of the reduced picture, then a real unreduced picture is coded by utilizing a result of this precedence coding, and therefore, in addition to actual coding time of the real image, coding time of the reduced picture needs being processed within 1-picture time.

Accordingly, the time expendable for coding the should-be-coded real picture is shorter than the 1-frame time, so that in the technique employing the conventional art described above, processing performance of the single-system encoder is required to be set higher than the performance of a normal encoder.

Moreover, in the moving picture coding system using the motion-compensated inter-frame prediction, with respect to the picture such as B-picture in which bidirectional motion-compensated inter-frame prediction is conducted, a picture frame in the future needs coding earlier than this picture frame, and hence an actually inputted frame sequence is required to be reordered in the sequence for coding (a reordering process). FIG. 9 illustrates an outline of the reordering process for the inputted picture frames. FIG. 9 is a diagram showing a conventional coding method that employs the reordering.

In such a coding method, however, a time lag (idling time in FIG. 9) occurs due to reordering for a period from an input of the first frames (B0 and B1) to a start of the first coding process (coding of I2). During a period of this idling time, the encoder executing the coding process comes to an idling status where the encoder performs none of the processes.

Similarly, the moving picture coding system has a method of coding the frames by such a drop-frame technique that the inputted pictures are thinned out (see FIG. 10). In such a coding method also, the encoder is in the idling status where none of the processes are executed for the frame time when the frames are dropped.

Thus, in the conventional arts, even when enhancing the processing performance of the encoder in a way that expands a hardware scale in order to actualize the high-efficiency coding equivalent to the 2-path coding system, there was a case where the performance of the encoder was not sufficiently utilized depending on the coding method.

SUMMARY OF THE INVENTION

It is an object of the present invention, which was devised in view of the problems described above, to provide a moving picture coding device that actualizes the high-efficiency coding without depending on the performance of the encoder.

The present invention adopts the following configurations in order to solve the problems. Namely, the present invention is related to a moving picture coding device coding picture frames each having any one of a plurality of picture types and inputted sequentially at a predetermined frame interval, comprising a pre-processing unit sequentially outputting, as a coding target frame, each of the picture frames sequentially inputted, a coding unit coding the sequentially outputted coding target frame by a predictive coding method corresponding to a picture type of the coding target frame on the basis of a coding scheme corresponding to the coding target frame, a control unit controlling, when detecting a frame interval at which the coding target frame is not outputted from the pre-processing unit, the coding unit to code a predetermined picture frame, and a modifying unit acquiring coding information from coded data coded by the control of the control unit, and modifying the coding scheme corresponding to the coding target frame from the coding information.

In the present invention, there is detected the frame interval at which any coding target frame is not outputted from the pre-processing unit, i.e., idling time of the coding unit that does not execute coding, and the predetermined picture frame is coded by utilizing this idling time. Then, the coding information acquired by this coding is utilized when coding each coding target frame thereafter.

Thus, in the present invention, a first path coding is carried out by utilizing the idling time of the coding unit, thereby enabling the coding equivalent to the 2-path coding to be actualized without depending on performance of the coding unit itself. In the present invention, it follows that an operating efficiency of the coding unit is increased.

Further, the present invention is, with respect to the moving picture coding device described above, related to a moving picture coding device actualizing a coding system that uses reordering. In this case, the pre-processing unit sequentially outputs, as a coding target frame, each of the sequentially inputted picture frames in the output sequence corresponding to a picture type of the picture frame. The control unit further includes instructing unit instructing, when detecting the frame interval at which the coding target frame is not outputted from the pre-processing unit, the pre-processing unit to output the same precedence picture frame as the picture frame already inputted to the pre-processing unit and waiting for its turn in the output sequence, and controls, when the precedence picture frame is outputted, the coding unit to code the precedence picture fame by a predetermined predictive coding method. Furthermore, the modifying unit acquires coding information from coded data of the coded precedence picture frame, and modifies the coding scheme corresponding to the coding target frame from the coding information.

In the present invention, the reordering is executed by the pre-processing unit, and the coding target frames are outputted in a should-be-coded sequence. With this operation, the idling time of the coding unit is detected by the control unit as timing when the picture frame waits for its turn in the outputting sequence and is not outputted by the pre-processing unit. Then, when the control unit detects the idling time of the coding unit, the same precedence picture frame as the picture frame waiting for its turn in the outputting sequence is transferred to the coding unit and is coded by the predetermined predictive coding method in this idling time of the coding unit. Then, the coding scheme is modified based on the coding information acquired from the coded data of this precedence picture frame.

Thus, in the present invention, even in the case of actualizing the coding method using the reordering, the first path coding is conducted by utilizing the idling time of the coding unit before the actual coding target frame is coded, thereby enabling the coding equivalent to the 2-path coding to be actualized by increasing the operating efficiency of the coding unit without enhancing the performance of the coding unit.

Further, in the first path coding in the present invention, the coding information is generated from the coded data by use of the actual picture data without using the reduced picture data, whereby the coding based on the accurate coding scheme can be actualized.

The control unit in the moving picture coding device that actualizes the coding system utilizing the reordering, may determine the predetermined predictive coding method, if one other precedence picture frame was previously coded by the coding unit, as forward inter-frame prediction coding that refers to this one other precedence frame, and may determine the predetermined predictive coding method, if this one other precedence picture frame was not coded previously, as intra-frame prediction coding.

In the present invention, at the first path coding time, the predictive coding method of the precedence picture frame is determined without depending on the picture type having the precedence picture frame. Moreover, on the occasion of determining this predictive coding method, if one other precedence picture frame has been coded before, the coding based on the forward inter-frame prediction is selected.

With this contrivance, it is considered that the coding information acquired at the first path coding time becomes more approximate to the coding information when coding the coding target frame, and hence this contributes to work out the accurate coding scheme.

Further, the present invention is, with respect to the moving picture coding device describe above, related to a moving picture coding device actualizing a coding system that executes a drop-frame process. In this case, the pre-processing unit thins out sequentially inputted picture frames at pre-determined thin-out rate, and sequentially outputs each of the unremoved picture frames as a coding target frame. The control unit controls, when detecting a frame interval at which the coding target frame is not outputted from the pre-processing unit, the coding unit to recode the coding target frame already coded by the coding unit. The modifying unit acquires coding information from coded data of the coded and/or recoded coding target frame, and modifying the coding scheme corresponding to the coding target frame from the coding information.

In the present invention, the pre-processing unit drops the frames, and each of the undropped (unremoved) picture frames is outputted as a coding target frame. With this operation, the idling time of the coding unit is detected by the control unit as timing when the pre-processing unit should thin out the picture frames and the removed picture frames should be originally outputted. Then, the already-coded picture frames are recoded in this idling time of the coding unit. Then, the coding scheme is modified based on the coding information acquired from the coded data of the recoded coding target frame.

Each time the picture fame is recoded, the coding scheme is modified, and therefore the accuracy of the coding scheme must normally be improved. Hence, in the present invention, the recoding can be executed so as to more improve the coding efficiency and/or the coding quality by utilizing the idling time of the coding unit, whereby the coding device having the high performance can be actualized by increasing the operating efficiency of the coding unit without enhancing the performance of the coding unit.

Moreover, the moving picture coding device actualizing the coding that performs the drop-frame process further comprises a storage unit storing the coded data coded by coding unit and coded data recoded by the control of the control unit, and selecting unit selecting any one piece of coded data about the same coding target frame stored in the storage unit.

In the present invention, during the frame interval of the frames thinned out by the pre-processing unit, the recoding is conducted, however, the desired coded data can be selected from the coded data as a result of the recoding.

Then, the selecting unit may select the coded data of a high coding efficiency and/or a high coding quality on the basis of the coding information.

With this operation, with respect to the recoding target frames to be recoded during the frame interval of the frames thinned out by the pre-processing unit, the desired picture frame can be selected from the already-coded picture frames, and hence, even if the previous coding scheme is not accurate, the coding can be redone. In this case also, the coding can be actualized without depending on the performance of the coding unit.

It should be noted that the present invention can be realized as a moving picture coding method having the same features as those of the moving picture coding device according to the present invention, as a program making an information processing device (computer) function as the moving picture coding device according to the present invention, or as a recoding medium recorded with this program.

According to the present invention, it is possible to provide the moving picture coding device actualizing the high-efficiency coding without depending on the performance of the encoder.

DESCRIPTION OF THE PREFERRED EMBODIMENTS

A moving picture coding device in each of embodiments of the present invention will hereinafter be described with reference to the drawings. It is to be noted that configurations in the embodiments, which will be explained as follows, are exemplifications, and the present invention is not limited to the configurations in the following embodiments.

First Embodiment

Figure 1:
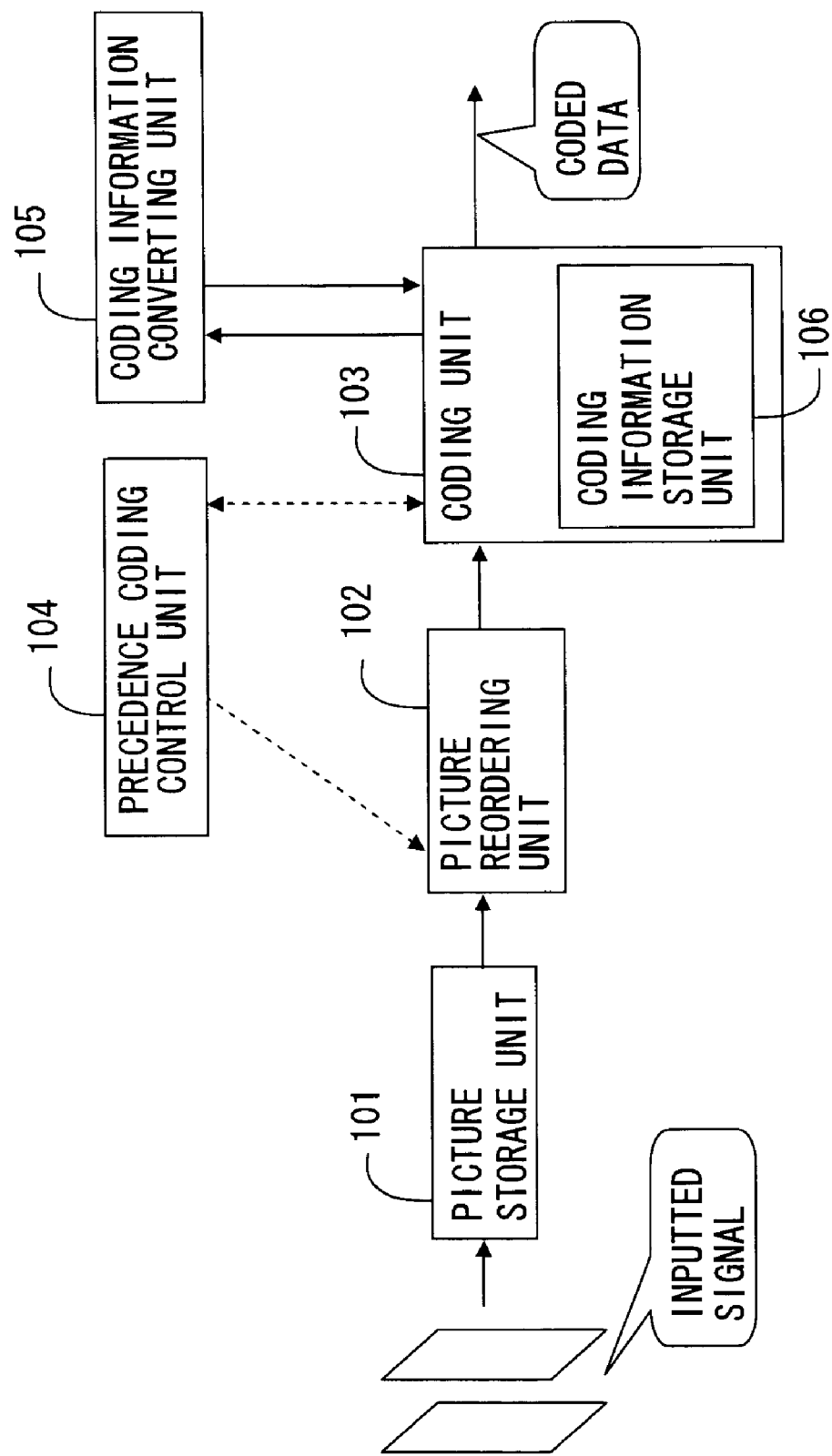
FIG. 1 is a diagram showing a configuration of a moving picture coding device in a first embodiment.

The moving picture coding device in a first embodiment of the present invention will hereinafter be discussed.
[Configuration of Device]
To start with, a configuration of the moving picture coding device in the first embodiment will be explained with reference to FIG. 1. FIG. 1 is a block diagram showing the configuration of the moving picture coding device in the first embodiment. The moving picture coding device includes a CPU (Central Processing Unit), a variety of memories, an input/output interface, etc. In the moving picture coding device, the CPU executes a control program stored in the memory, thereby actualizing respective function units that will hereinafter be explained. Further, the respective function modules, which will be shown as below, may also be actualized as hardware.

Figure 9:
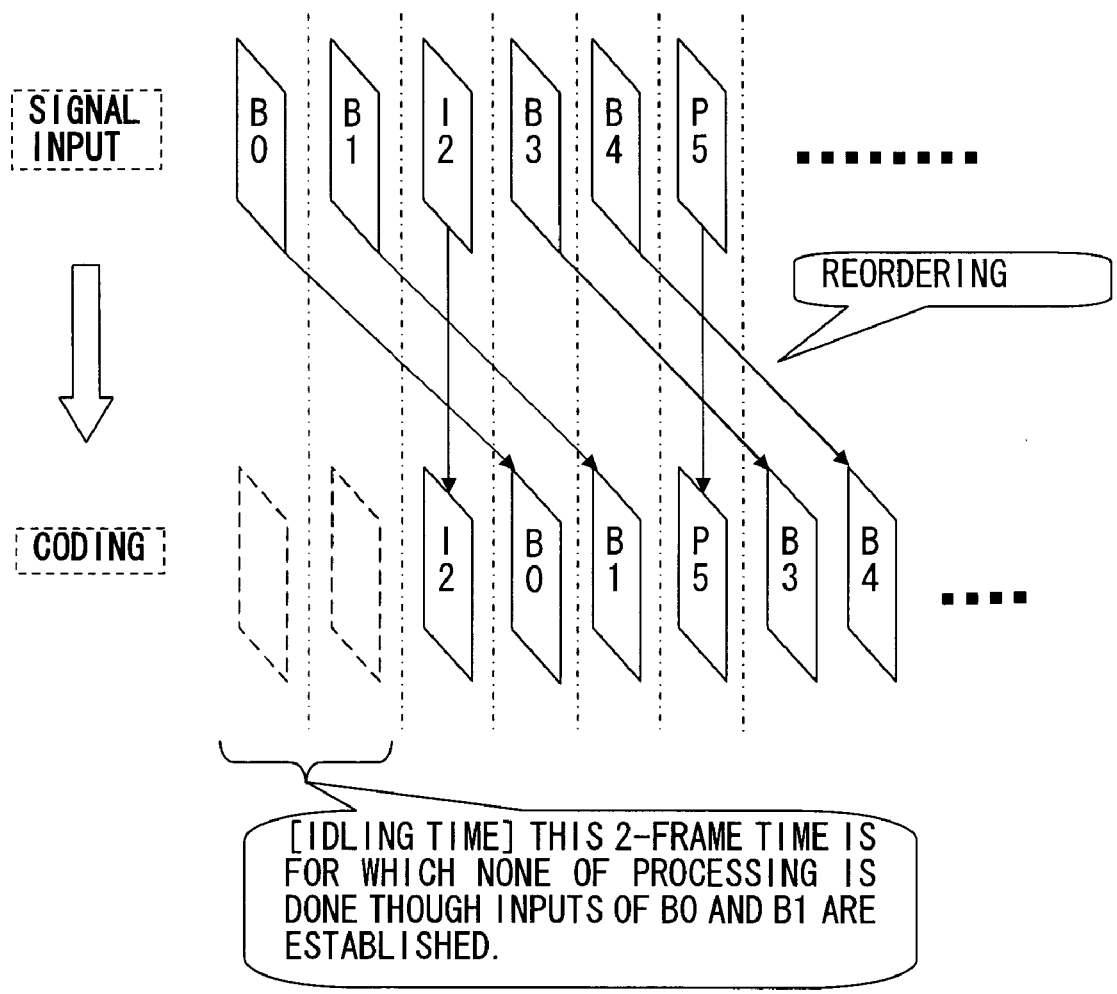
FIG. 9 is a diagram showing a conventional coding method that uses reordering.

Moreover, in the moving picture coding device in the first embodiment, a case of adopting an MPEG2 (Moving Picture Experts Group phase 2) when a GOP (Group Of Picture) structure is an IBBP (I-frame/B-frame/B-frame/P-frame) structure, shall be exemplified as a coding system. Accordingly, picture signals having the frame structure (I-picture, P-picture and B-picture) as shown in FIG. 9 are inputted to the moving picture coding device. The I-picture, the P-picture and the B-picture are described in the item of Background Art. It should be noted that the present invention does not limit this coding system.

As shown in FIG. 1, the moving picture coding device in the first embodiment includes a picture storage unit 101, a picture reordering unit 102, a coding unit 103, a precedence coding control unit 104, a coding information converting unit 105, etc. In-depth descriptions of these respective function units will hereinafter be given.

<Picture Storage Unit>

The picture storage unit 101 is, when receiving, e.g., input picture signals (B0, B1, I2, B3, B4, P5) as shown in FIG. 9, stores these picture signals on a frame-by-frame basis. Further, the picture storage unit 101 transfers the stored frames sequentially to the picture reordering unit 102.

The picture reordering unit 102 reorders the picture frames transferred from the picture storage unit 101 in the coding sequence, and transfers the picture frames to the coding unit 103 in the reordering sequence. To be specific, the picture reordering unit 102 receives the frames from the picture storage unit 101 in the sequence (B0, B1, I2, B3, B4, P5) as shown in an upper part in FIG. 9, and reorders these frames in a sequence (I2, B0, B1, P5, B3, B4) as shown in the lower part in FIG. 9. The picture reordering unit 102 transfers the frames to the coding unit 103 in the sequence from the reordering-established frame.

<Precedence Coding Control Unit>

The precedence coding control unit 104 performs control when coding in precedence (this process will hereinafter be also termed precedence coding). This precedence coding process is a process corresponding to coding of a first path. The precedence coding control unit 104 detects a period of idling time of the coding unit 103, i.e., a period of frame time during which the coding unit 103 does not execute the coding process. Specifically, the precedence coding control unit 104, when detecting that the frame B0 is inputted to the picture reordering unit 102 and that there is no other frame to be inputted to the coding unit 103 while the frame B0 is not originally inputted as it is to the coding unit 103, judges that the coding unit 103 is in an idling status. Herein, the frame time represents time (timing) when each individual frame is processed by the moving picture coding device, and represents, for instance, the timing when any one of the frames is inputted to the picture reordering unit 102.

The precedence coding control unit 104, when detecting the idling time of the coding unit 103, instructs the picture reordering unit 102 to transfer a copy of the inputted frame to the coding unit 103, and also instructs the coding unit 103 to execute the precedence coding. For example, when the frame B0 is inputted to the picture reordering unit 102, the precedence coding control unit 104 instructs the picture reordering unit 102 to transfer the copy to the coding unit 103 while holding the frame B0 for reordering the picture, and also instructs the coding unit 103 to execute the precedence coding. Next, in the case of inputting the frame B1 to the picture reordering unit 102, the precedence coding control unit 104 similarly judges that the coding unit 103 comes to the idling status, and instructs the picture reordering unit 102 and the coding unit 103 to conduct the precedence coding. Note that the picture frame outputted to the picture reordering unit 102 when executing the precedence coding is not necessarily the copy of the inputted frame but may be a picture frame into which the inputted frame is subjected to any of the processes.

If these frames Bo and B1 would be inputted to the picture reordering unit 102, it did not hitherto happen that the frames B0 and B1 were transferred to the coding unit 103 for reordering till a next frame I2 will have been inputted. The frames B0 and B1 transferred to the coding unit 103 by the instruction given from the precedence coding control unit 104 are held separately by the picture reordering unit 102 in order to reorder for the actual coding.

<Coding Unit>

The coding unit 103 encodes the frames in the sequence of the frames being transferred from the picture reordering unit 102. The coding by the coding unit 103 is roughly categorized into two scenes. One scene is that the precedence coding is performed by the instruction given from the precedence coding control unit 104, and corresponds to a first path coding process. The other scene is that the actual coding is executed for outputting the inputted frame as coded data (an actual coding scene), and corresponds to a second path coding process. The picture data coded by the actual coding process is outputted to one other function unit from the moving picture coding device.

Herein, the actual coding process of the coding unit 103 will be explained. The coding unit 103, on the occasion of the actual coding process, determines the coding method on the basis of a picture type of the coding target frame. In the case of the I-picture, the I-picture is coded by the intra-frame prediction, and hence the coding can be attained by using only the coding target frame. On the other hand, the P-picture is coded by the unidirectional motion-compensated inter-frame prediction (which will hereinafter be also referred to simply as the unidirectional prediction or the forward prediction) from the I-picture or the P-picture in the past, so that the picture in the past, which is required for the coding, is referred to on the occasion of the coding. The coding unit 103 holds the frames inputted when the coding was previously conducted for a predetermined period for the picture that is thus subjected to the inter-frame prediction.

The B-picture is coded by the bidirectional motion-compensated inter-frame prediction (which will hereinafter be also referred to simply as the bidirectional prediction) from the I-picture or the P-picture in the past and the I-picture or the P-picture in the future, and therefore the pictures both in the past and in the future, which are needed for the coding, are referred to on the occasion of the coding. The coding unit 103, however, receives the frames reordered normally in the coding sequence, and hence the I-picture or the P-picture, which is needed for coding the B-picture, must have already been coded. Accordingly, always, the coding unit 103 may simply hold the frames inputted when the coding was previously conducted. It is to be noted that the B-picture is coded normally by the bidirectional prediction, however, if inputted in the frame sequence as in FIG. 9, the bidirectional prediction can not be done because of having none of the frames before the frames B0 and B1 when coding the frames B0 and B1. Such a case involves using the coding based on the backward prediction that refers to only the frame I2.

Further, the coding unit 103 acquires pieces of coding information such as a generated code quantity and an average quantization value with respect to the coding from the coded data obtained by the frame coding. The thus-acquired coding information is stored in the coding information storage unit 106. The coding unit 103 makes a coding scheme by use of the coding information (containing the prediction coding information) stored in the coding information storage unit 106. The coding unit 103 executes coding quantity control, quantization control, etc based on this coding scheme, thereby coding the target frame. With this coding scheme, scheme values such as a generated code quantity predictive value and an average quantization predictive value are determined. It should be noted that this coding scheme itself may simply employ the technology that is generally known, and the present invention does not particularly limit the coding scheme itself on condition that the coding information acquired by the precedence coding is used.

Next, a process by the coding unit 103 when effectuating the precedence coding will be explained. The coding unit 103, when a predetermined frame is inputted, upon receiving the precedence coding instruction from the precedence coding control unit 104, precedence-codes the inputted frame by the intra-frame prediction or the forward prediction. At this time, the coding unit 103, if a previously precedence-coded frame exists, precedence-codes the frame by the forward prediction that refers to the inputted frame at that time and, on the occasion of the precedence coding for the first time, precedence-codes the frame by the intra-frame prediction.

The example in FIG. 9 is that the coding unit 103, when the frame B0 is inputted, receives the precedence coding instruction from the precedence coding control unit 104. With this instruction, the coding unit 103, though the unit 103 codes the frame originally by the bidirectional or backward inter-frame prediction because of the frame B0 being categorized as the B-picture in its picture type, codes the frame B0 by the intra-frame prediction.

Moreover, the coding unit 103, when the frame B1 is inputted next, also receives the precedence coding instruction from the precedence coding control unit 104. With this instruction, the coding unit 103, though the unit 103 codes the frame originally by the bidirectional or backward inter-frame prediction because of the frame B1 being categorized as the B-picture in its picture type, codes the frame B1 by the forward inter-frame prediction from the previously inputted frame B0.

The coding unit 103 acquires the coding information from the coded data that has been precedence-coded. The coding unit 103 transfers the acquired coding information to the coding information converting unit 105. The coding information converting unit 105 performs a predetermined conversion of this coding information, and the converted coding information is transferred again back to the coding unit 103. The coding unit 103 stores the coding information storage unit 106 with the predictive coding information transferred from the coding information converting unit 105. At this time, the predictive coding information transferred from the coding information converting unit 105 is used for working out the coding scheme at the actual coding time with respect to the frames I2, B0, B1, P5 and B3.

<Coding Information Converting Unit>

The coding information converting unit 105, when receiving the coding information with respect to the coded data that has been precedence-coded, converts the coding information into the predictive coding information utilized for the actual coding of each target frame. The thus-converted predictive coding information is transferred again back to the coding unit 103. This predictive coding information is information obtained by converting the coding information acquired by the precedence coding of the coding unit 103 into the coding information equivalence after the actual coding of the target frame. In this converting process, a relative value of coding difficulty level corresponding to the actual coding method of each target frame is determined by the standard of a coding difficulty level corresponding to the precedence coding method, and the coding information equivalence after the actual coding of each target frame is each predicted based on the relative value of each coding difficulty level.

The coding difficulty level described above is determined based on the following guideline. A case where each of the frames B0 and B1 is precedence-coded, will be explained in a way that gives an example in FIG. 9. The precedence-coding of the frame B0 is the coding by the intra-frame prediction and is the same actual coding method for the I2 frame. Accordingly, the precedence-coding of the frame B0 and the actual coding of the I2 frame have substantially the same coding difficulty level.

Further, the precedence-coding of the frame B1 is the coding by the forward prediction that refers to the frame B0 just anterior to the frame B1. On the other hand, the actual coding of the frame P5 is the coding by the forward prediction, however, the frame P5 is coded by referring to the I-picture or the P-picture before 3-frame time. With this scheme, as the frame gets closer in frame time, the picture thereof becomes more approximate in terms of property of the picture frame, and it is therefore considered that the precedence-coding of the frame B1, which refers to the frame closer in frame time, even if being the same forward prediction coding, has a lower coding difficulty level than the actual coding of the P-picture.

Further, in the B-picture actual coding (frame B3) by the bidirectional prediction, the B-picture is coded by referring to the I-picture or the P-picture in the past and the I-picture or the P-picture in the future, and hence it is considered that the B-picture actual coding has a higher coding difficulty level than the frame B1 precedence-coding by the unidirectional prediction.

The actual coding of the frame B0 is, however, even if being the B-picture, the coding by the backward prediction for 2-frame time, and is therefore considered to be the coding by the same unidirectional prediction as the precedence-coding of the frame B1. Hence, the coding difficulty level of the actual coding of the frame B0 is regarded higher in terms of a difference in frame time than the precedence-coding of the frame B1. Moreover, the actual coding of the frame B1 is the coding by the backward prediction that refers to the frame just posterior to the frame B1 and is therefore considered to have substantially the same coding difficulty level as the precedence-coding of the frame B1 has.

Figure 2:
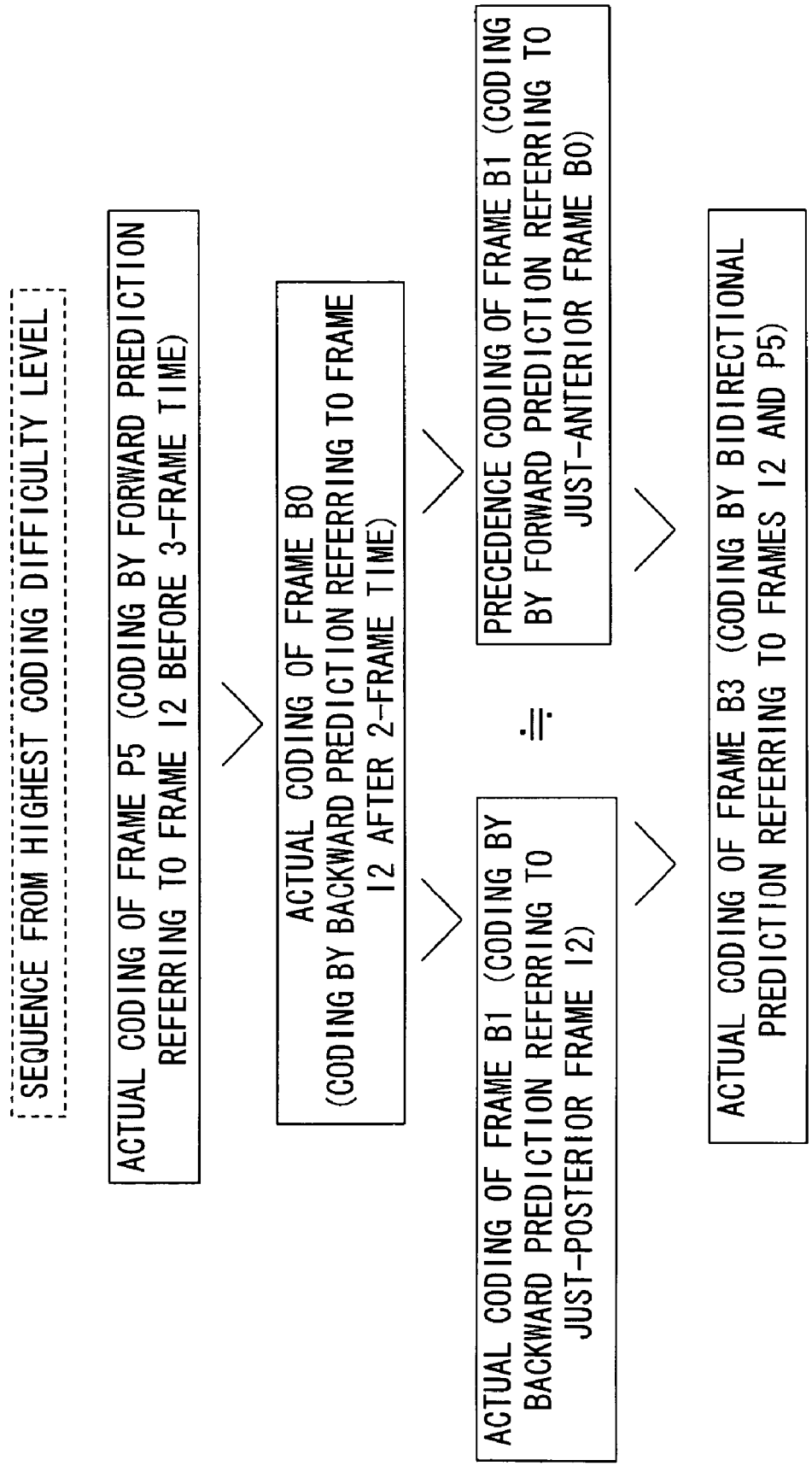
FIG. 2 is a diagram showing a coding difficulty level by the standard of precedence-coding of a frame B1.

A relationship between the coding difficulty levels based on the frame B1 precedence-coding as the standard, can be given as in FIG. 2 according to the guideline described above. FIG. 2 is a diagram showing the coding difficulty levels based on the frame B1 precedence-coding as the standard.

The coding information of the frame B0, which is precedence-coded based on such coding difficulty levels, is transferred intact as the predictive coding information for the actual coding of the I2 frame to the coding unit 103. Note that when the coding information on this frame B0 is transferred as the predictive coding information for the actual coding of the I2 frame, the converting process may be executed to some extent.

Moreover, the coding information about the precedence-coded frame B1 is converted into the predictive coding information for the actual coding of the frames P5, B0, B1 and B3. Specifically, the coding information converting unit 105 acquires the predictive coding information by multiplying the coding information based on the precedence-coding of the frame B1 by a conversion coefficient corresponding to the coding difficulty level.

For instance, the frame generated code quantity contained in the coding information may also be converted as follows. A predicted generated code quantity after the actual coding of the frame B3 shall be a value obtained by multiplying the generated code quantity based on the precedence-coding of the frame B1 by the conversion coefficient (0.8) based on the corresponding coding difficulty level. Further, a predicted generated code quantity after the actual coding of the frame P5 shall be a value obtained by multiplying the generated code quantity based on the precedence-coding of the frame B1 by the conversion coefficient (1.2). A predicted generated code quantity after the actual coding of the frame B0 shall be a value obtained by multiplying the generated code quantity based on the precedence-coding of the frame B1 by the conversion coefficient (1.1). A predicted generated code quantity after the actual coding of the frame B1 shall be a value obtained by multiplying the generated code quantity based on the precedence-coding of the frame B1 by the conversion coefficient (1.0).

Note that the discussion made above does not deal with the predictive coding information for the actual coding of the frame B4, however, this is because the coding of the frame B4, it is considered, may use, as the predictive coding information, the coding information on the frame B3 just anterior to the frame B4, and it is considered that there is no necessity of using the predictive coding information acquired from the precedence-coding. Moreover, the conversion coefficients (0.8, 1.0, 1.1 and 1.2) are the values given by way of examples, and the present invention is not limited to these values. These conversion coefficients may be values outputted by a predetermined algorithm each time, may also be constants stored previously in a memory etc, and may further be stored as values adjustable from outside.

Similarly, the average quantization value etc contained in the coding information is likewise converted.

It should be noted that the respective function units execute the processes as described above with respect to the precedence-coding and the actual coding for a length of several-frame time after the precedence-coding, however, it may be sufficient for the coding of the subsequent frames (after the frame B6) that the coding corresponding to the picture type is conducted, and the present invention does not limit these coding processes.

[Operational Example]

Figure 3:
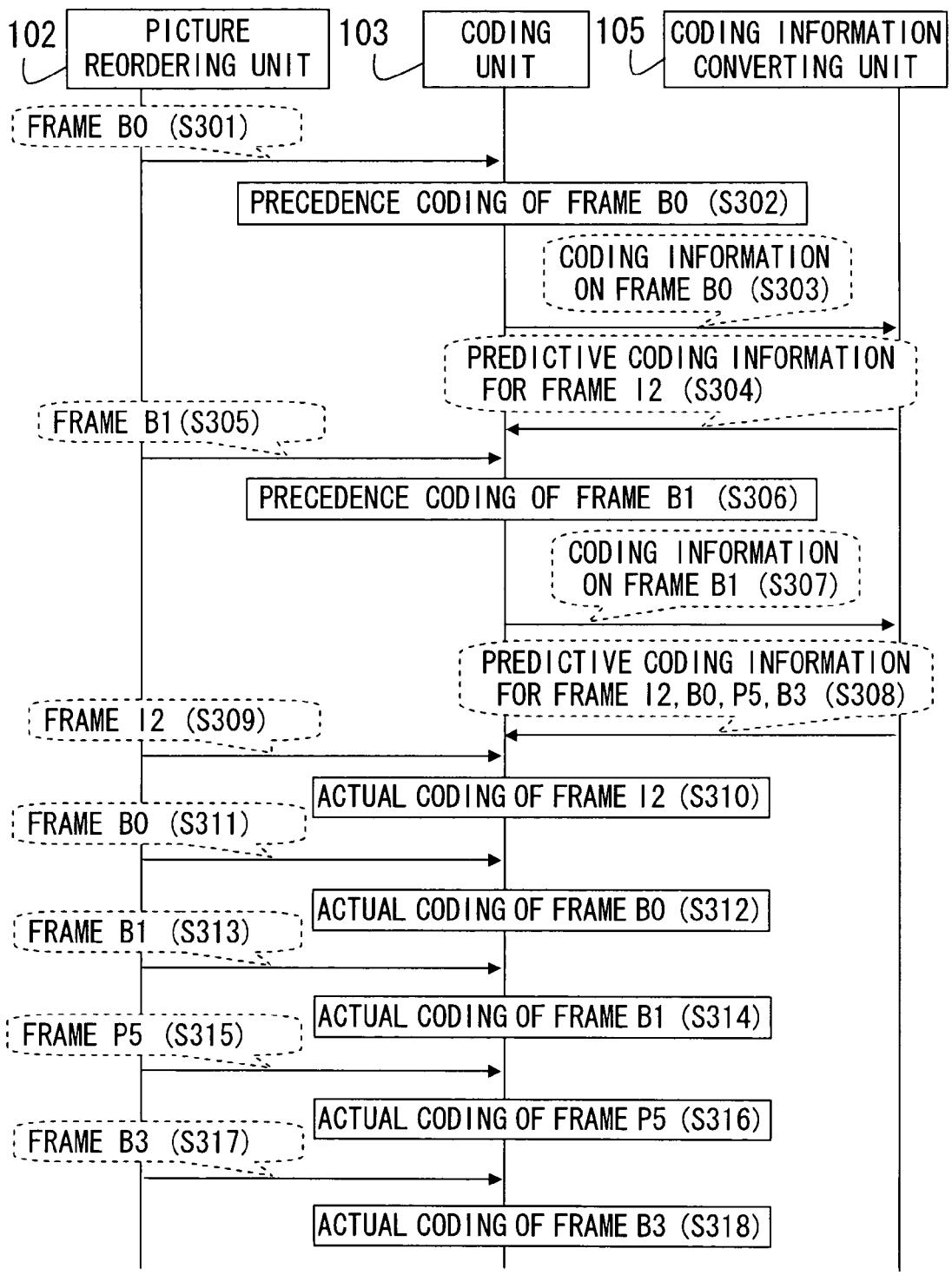
FIG. 3 is a diagram showing an operational example of the moving picture coding device in the first embodiment.

Next, an operational example of the moving picture coding device in the first embodiment will hereinafter be described with reference to FIG. 3. FIG. 3 is a flowchart showing the operational example of the moving picture coding device in the first embodiment, and this is the operational example in such a case that the picture signal shown in FIG. 9 is inputted.

The picture signals inputted to the picture storage unit 101 are sequentially inputted to the picture reordering unit 102 on the frame-by-frame basis. With this inputting, the picture frames are inputted to the picture reordering unit 102 in the following sequence.

To begin with, the frame B0 is inputted to the picture reordering unit 102. At this time, the precedence-coding control unit 104 judges that the frame B0 is not inputted as it is to the coding unit 103 and that the coding unit 103 comes to the idling status. The precedence-coding control unit 104 instructs, based on this judgment, the picture reordering unit 102 to transfer the frame B0 to the coding unit 103 and further instructs the coding unit 103 to execute the precedence-coding. With this operation, the frame B0 is inputted to the coding unit 103 (S301).

The coding unit 103 precedence-codes the frame B0 by the intra-frame prediction (S302). The coding unit 103 subsequently acquires the coding information from the coded data of the precedence-coded frame B0. The coding information on this precedence-coded frame B0 is transferred to the coding information converting unit 105 (S303).

The transferred coding information on the frame B0 is the coding information on the coding by the intra-frame prediction, and hence the coding information converting unit 105 converts the coding information into the coding information equivalence after the actual coding of the frame I2. At this time, the coding information converting unit 105, because of the actual coding of the frame I2 being the coding by the intra-frame prediction and because of the precedence-coding of the frame B0 being also the coding by the intra-frame prediction, does not convert and may transfer the coding information on the frame B0 as it is to the coding unit 103 (S304). The predictive coding information transferred to the coding unit 103 is stored in the coding information storage unit 106.

Subsequent to the frame B0, the frame B1 is inputted to the picture reordering unit 102 at the next frame time. At this time also, the precedence-coding control unit 104 judges that the coding unit 103 comes to the idling status, then instructs the picture reordering unit 102 to transfer the frame B1 to the coding unit 103 and further instructs the coding unit 103 to execute the precedence-coding. With this operation, the frame B1 is inputted to the coding unit 103 (S305).

The coding unit 103 refers to the frame B0 anterior to the frame B1 and performs the precedence-coding by the forward prediction (S306). The coding unit 103 acquires the coding information from the coded data of the consecutively precedence-coded frame B1. The coding information about this consecutively precedence-coded frame B1 is transferred to the coding information converting unit 105 (S307).

The transferred coding information about the frame B1 is the coding information about the coding by the forward prediction of the frame B0 just anterior to the frame B1, and hence the coding information converting unit 105 converts the coding information into the coding information equivalence after the actual coding of the B-picture subsequent to the frames B0, B1, P5 and B3. At this time, the coding information converting unit 105 converts the coding information related to the frame B1 on the basis of the precedence-coding by use of the conversion coefficients corresponding to the respective coding difficulty levels with respect to the precedence-coding of the frame B1 and the actual coding of each target frame. Each piece of thus-converted predictive coding information is transferred to the coding unit 103 (S308) and is stored in the coding information storage unit 106. With this operation, In the coding information storage unit 106, the predictive coding information for the actual coding of the frames I2, B0, B1, P5 and B3 are stored at this point of time.

Subsequent to the frame B1, the frame I2 is inputted to the picture reordering unit 102 at the next frame time. At this time, the picture reordering unit 102 already retains the frames B0 and B1. The picture reordering unit 102, when judging that the frame I2 is the frame that should be actually coded at first, transfers the frame I2 as it is to the coding unit 103 (S309).

The coding unit 103 performs the actual coding of the transferred frame I2 by the intra-frame prediction, according to the picture type thereof (S310). At this time, the coding unit 103 makes the coding scheme based on the predictive coding information for coding the frame I2 in the predictive coding information stored in the coding information storage unit 106, thereby actually coding the frame I2.

Subsequent to the frame I2, the frame B3 is inputted to the picture reordering unit 102 at the next frame time. At this time, the picture reordering unit 102 already retains the frames B0 and B1. The picture reordering unit 102, when judging in this frame time that the retained frame B0 is the frame that should be actually coded, transfers the frame B0 to the coding unit 103 (S311).

The coding unit 103 actually codes the transferred frame B0. In this case, the frame B0 is actually coded by the backward prediction that refers to only the frame I2 because of non-existence of the reference frame in the past (S312). At this time, the coding unit 103 works out the coding scheme based on the predictive coding information for coding the frame B0 in the predictive coding information stored in the coding information storage unit 106, thereby actually coding the frame B0.

Subsequent to the frame B3, the frame B4 is inputted to the picture reordering unit 102 at the next frame time. At this time, the picture reordering unit 102 already retains the frames B1 and B3. The picture reordering unit 102, when judging in this frame time that the retained frame B1 is the frame that should be actually coded, transfers the frame B1 to the coding unit 103 (S313).

The coding unit 103 actually codes the transferred frame B1 by the backward prediction that refers to only the frame I2 because of non-existence of the reference frame in the past (S314). At this time, the coding unit 103 works out the coding scheme based on the predictive coding information for coding the frame B1 that is stored in the coding information storage unit 106, thereby actually coding the frame B1.

Subsequent to the frame B4, the frame P5 is inputted to the picture reordering unit 102 at the next frame time. At this time, the picture reordering unit 102 already retains the frames B3 and B4. The picture reordering unit 102, when judging in this frame time that the frame P5 is the frame that should be actually coded, transfers the frame P5 to the coding unit 103 (S315).

The coding unit 103 performs the actual coding of the transferred frame P5 by the forward prediction that refers to the frame I2, according to the picture type thereof (S316). At this time, the coding unit 103 makes the coding scheme based on the predictive coding information for coding the frame P5 that is stored in the coding information storage unit 106, thereby actually coding the frame P5.

Subsequent to the frame P5, the frame B6 is inputted to the picture reordering unit 102 at the next frame time. At this time, the picture reordering unit 102 already retains the frames B3 and B4. The picture reordering unit 102, when judging in this frame time that the retained frame B3 is the frame that should be actually coded, transfers the frame B3 to the coding unit 103 (S317).

The coding unit 103 performs the actual coding of the transferred frame B3 by the bidirectional prediction that refers to the frame I2 and the frame P5, according to the picture type thereof (S318). At this time, the coding unit 103 works out the coding scheme based on the predictive coding information for coding the B-picture that is stored in the coding information storage unit 106, thereby actually coding the frame B3.

Hereafter, the frames are inputted to the coding unit 103 in the coding sequence reordered by the picture reordering unit 102 and are actually coded.

[Operation/Effect]

Herein, an operation and an effect of the moving picture coding device in the first embodiment discussed above will be stated.

The moving picture coding device in the first embodiment utilizes the idling time of the coding unit 103, wherein the precedence-coding is carried out. The predictive coding information is generated from the coding information acquired by this precedence-coding. The predictive coding information is utilized when executing the actual coding of each frame thereafter.

In the precedence-coding, when the frame not transferred directly to the coding unit 103 but waiting for the picture reordering is inputted to the picture reordering unit 102, a copy of this frame is inputted to the coding unit 103. The coding unit 103 precedence-codes the frame according to the precedence-coding instruction given from the precedence-coding control unit 104. This precedence-coding is that the coding is carried out by the intra-frame prediction or the forward prediction without depending on the picture type of the inputted frame. For this coding, the coding method is determined corresponding to the existence of the inputted frame before being retained by the coding unit 103. Namely, if the frame for the precedence-coding was previously inputted to the coding unit 103, the coding method by the forward prediction that refers to this inputted frame is adopted, and, whereas if the frame for the precedence-coding is not yet inputted to the coding unit 103, the coding method by the intra-frame prediction is adopted.

Subsequently, the coding information is acquired from the coded data of the precedence-coded frame, and this coding information is each converted into the precedence-coding information used for the coding scheme when actually coding each frame thereafter.

Thus, in the first embodiment, the precedence-coding is conducted by utilizing the idling time of the coding unit 103 before the actual coding is performed, and therefore the coding equal to the 2-path coding can be actualized by increasing the operating efficiency of the coding unit without enhancing the performance of the coding unit itself.

Further, the precedence-coding in the first embodiment involves using the actual picture data without employing the reduced picture data, and the predictive coding information is generated from the coded data, whereby the coding based on the accurate coding scheme can be actualized.

[Others]

Figure 4:
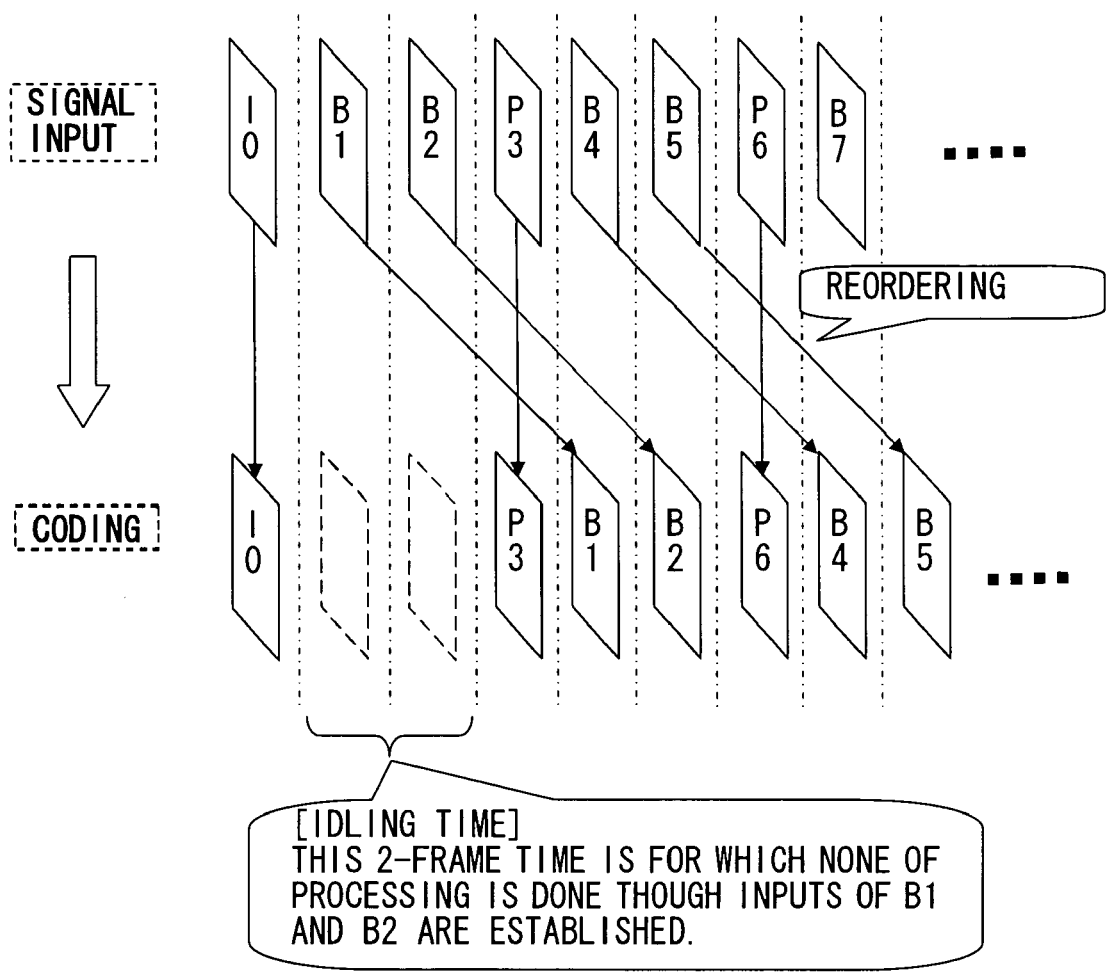
FIG. 4 is a diagram showing an outline of an operation in another case of picture signals in the first embodiment.

The first embodiment discussed above has exemplified the case in which the picture signal shown in FIG. 9 is inputted. Given hereinafter is a brief explanation of how the moving picture coding device likewise gets operable also in the case where the picture signals are inputted in the frame sequence other than shown in FIG. 9. FIG. 4 is a diagram showing an outline of the operation of the moving picture coding device in the case where the picture signals are inputted in the frame sequence different from in FIG. 9.

In the case where the picture signals shown in an upper part in FIG. 4 are inputted (I0, B1, B2, P3, . . . ), in the moving picture coding device, the coding unit 103 remains in the idling status during 2-frame time of the frames B1 and B2. Accordingly, in such a case, the moving picture coding device performs the precedence coding by use of the frames B1 and B2 in this 2-frame time.

Namely, when the frame I0 is inputted to the picture reordering unit 102, the frame I0 is transferred as it is to the coding unit 103, wherein the frame I0 is actually coded. Thereafter, when the frame B1 is inputted to the picture reordering unit 102, the precedence-coding control unit 104 judges that the frame B1 is not inputted as it is to the coding unit 103 and that the coding unit 103 comes to the idling status. The precedence-coding control unit 104 instructs, based on this judgment, the picture reordering unit 102 to transfer the frame B1 to the coding unit 103 and further instructs the coding unit 103 to execute the precedence coding. With this operation, the frame B1 is inputted to the coding unit 103.

The coding unit 103 precedence-codes the frame B1 by the intra-frame prediction. The coding unit 103 subsequently acquires the coding information from the coded data of the precedence-coded frame B1. The coding information on this precedence-coded frame B1 is converted by the coding information converting unit 105 into the coding information equivalence for coding the frame P3, and is stored in the coding information storage unit 106.

Subsequent to the frame B1, when the frame B2 is inputted to the picture reordering unit 102 at the next frame time, the precedence-coding control unit 104 judges that the coding unit 103 comes to the idling status, then instructs the picture reordering unit 102 to transfer the frame B2 to the coding unit 103 and further instructs the coding unit 103 to execute the precedence coding.

The coding unit 103 refers to the frame B1 anterior to the frame B2 and precedence-codes the frame B2 by the forward prediction. The coding unit 103 subsequently acquires the coding information from the coded data of the precedence-coded frame B1. The coding information on this precedence-coded frame B1 is transferred to the coding information converting unit 105, wherein the coding information is converted by a predetermined conversion coefficient. Each piece of converted predictive coding information is stored in the coding information storage unit 106.

Thus, even in the frame sequence shown in FIG. 4, the moving picture coding device detects the idling period of the coding unit 103 and executes the precedence coding by use of this idling period. Hereafter, the moving picture coding device works out the coding scheme by using the coding information acquired by the precedence coding and executes the actual coding of the frame to be inputted thereafter.

Second Embodiment

Figure 5:
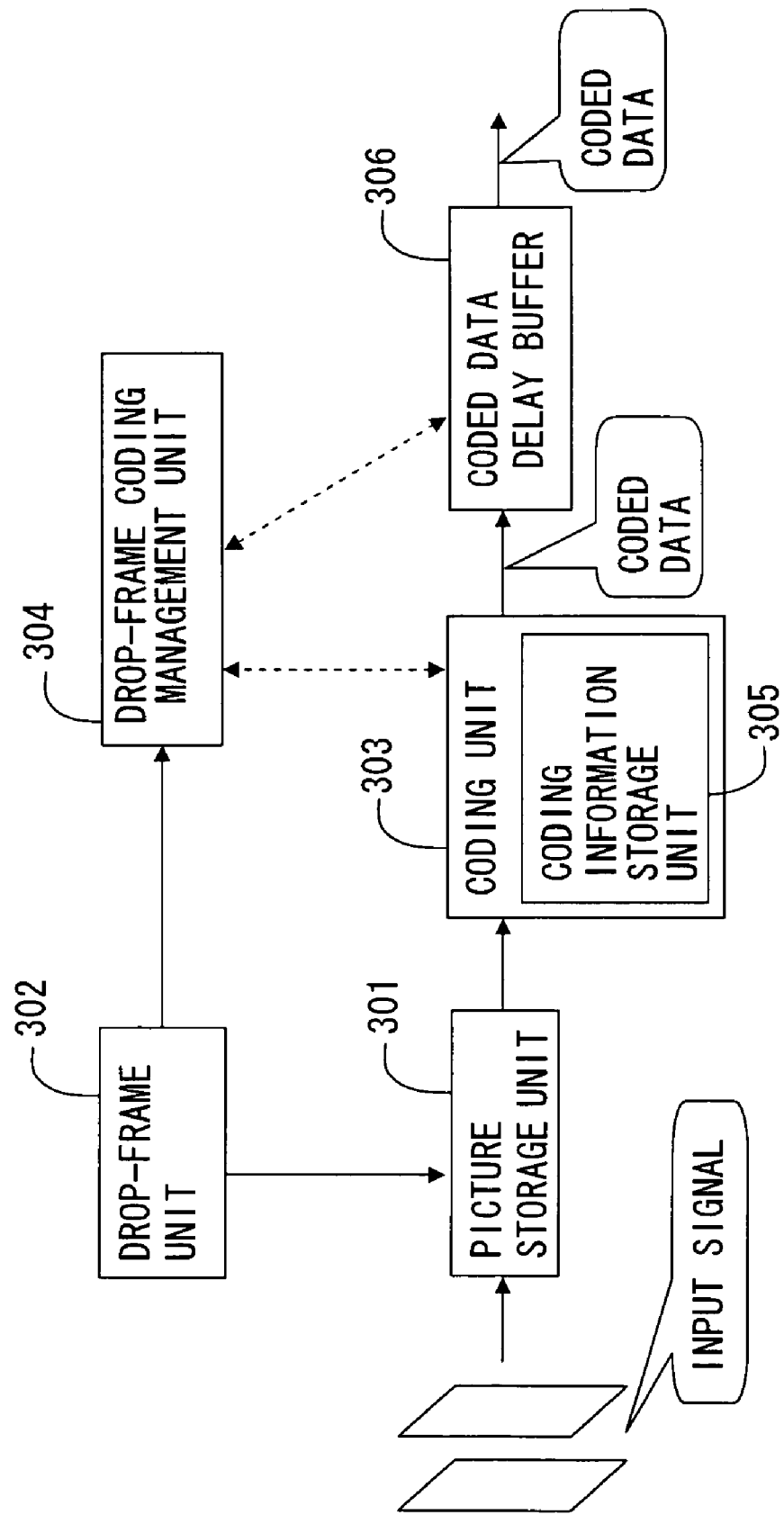
FIG. 5 is a diagram showing a configuration of the moving picture coding device in a second embodiment.

A moving picture coding device in a second embodiment of the present invention will hereinafter be described. The moving picture coding device in the first embodiment previously discussed actualizes the coding system that utilizes the reordering. The moving picture coding device in the second embodiment of the present invention is exemplified in the case of using a coding system that drops the frame. The hardware configuration of the moving picture coding device is the same as in the first embodiment, and hence its explanation is omitted. The respective function units of the moving picture coding device will hereinafter be described with reference to FIG. 5. FIG. 5 is a diagram showing a functional configuration of the moving picture coding device in the second embodiment.

Figure 10:
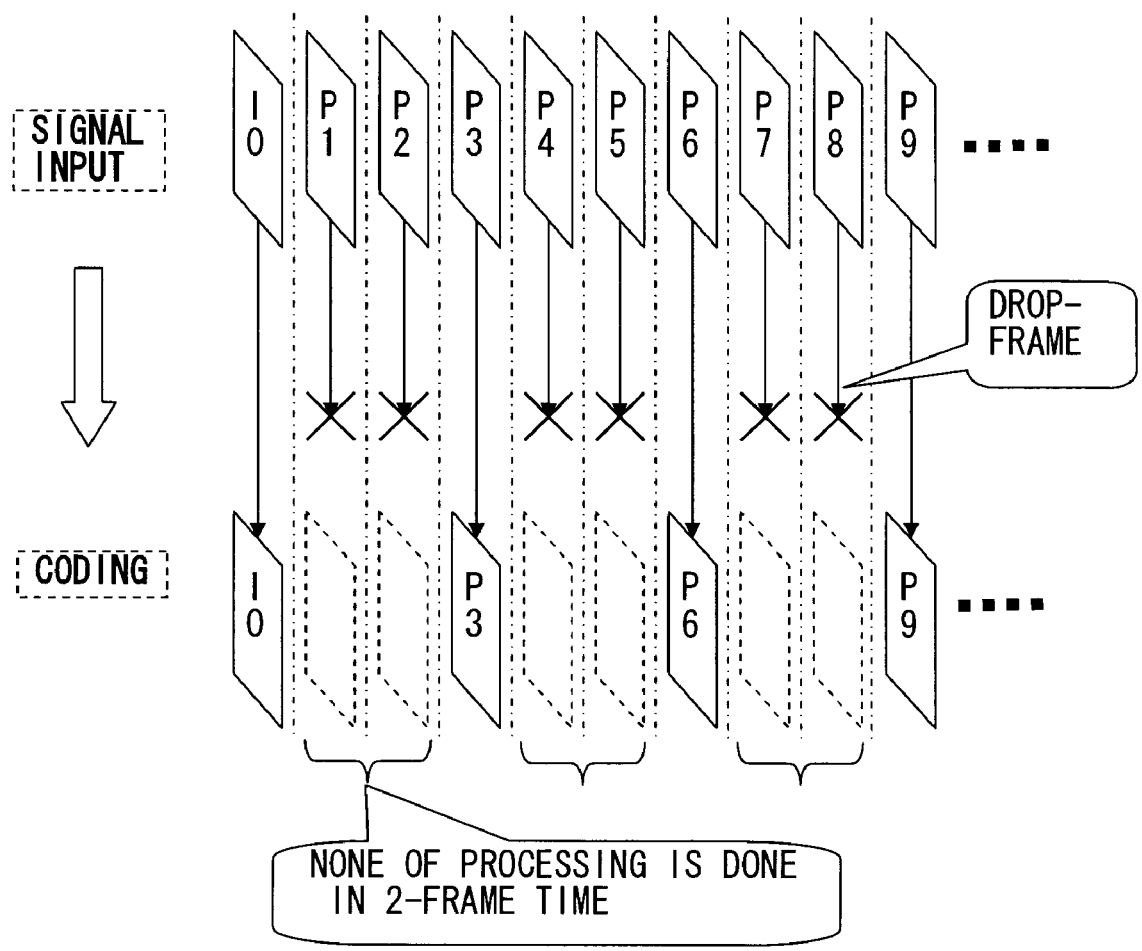
FIG. 10 is a diagram showing a conventional coding method using drop-frame.

The moving picture coding device in the second embodiment is exemplified in the case of adopting, as the coding system, an MPEG2 system in a case where the GOP structure is an IPPP frame structure and actualizing a frame rate "10 fps (frame per second) by drop-frame (⅓) control. Picture signals having a frame structure (I-picture and P-pictures) as shown in FIG. 10 are inputted to the moving picture coding device. The I-picture and the P-pictures are those described in the item of Background Art. It should be noted that the present invention does not limit this coding system.

As shown in FIG. 5, the moving picture coding device in the second embodiment includes a picture storage unit 301, a picture drop-frame unit 302, a coding unit 303, a drop-frame coding management unit 304, a coding information storage unit 305, a coded data delay buffer 306, etc. These function units will hereinafter be explained in detail.

<Picture Storage Unit>

The picture storage unit 301, when receiving, e.g., inputted picture signals (I0, P1-P9) as shown in an upper part in FIG. 10, stores these picture signals on the frame-by-frame basis. The picture storage unit 301 stores only the frames that are not dropped by the picture drop-frame unit 302 in the frames forming the picture signals, and sequentially transfers the stored frames to the coding unit 303.

<Picture Drop-Frame Unit>

The picture drop-frame unit 302, upon detecting that the picture signals are inputted to the picture storage unit 301, drops the frames of the inputted picture signals at a predetermined frame rate. In the second embodiment, the picture drop-frame unit 302 conducts drop-frame control of dropping the frames down to ⅓ as shown in a lower part in FIG. 10. With this drop-frame, it follows that the inputted picture signals are stored at a ⅓ frame rate in the picture storage unit 301. The present invention does not limit this frame rate. The frame rate may be stored, within the device, as a value adjustable from outside and may also be stored as a fixed value in a memory etc. The picture drop-frame unit 302 notifies the drop-frame coding management unit 304 of information on the drop-frame (drop-frame down to ⅓).

<Drop-Frame Coding Management Unit>

The drop-frame coding management unit 304 detects, from the drop-frame information of which the picture drop-frame unit 302 has notified, a period of frame time for which the coding unit 303 remains in the idling status in which the coding unit 303 does not execute the coding process. The drop-frame coding management unit 304, during the idling period with no input of the frame to the coding unit 303 from the picture storage unit 301 due to the drop-frame, controls the coding unit 303 and the coded data delay buffer 306 in order to execute the drop-frame coding.

As shown in FIG. 10, during the frame periods of the dropped frames P1, P2, P4, P5, P7 and P8, none of the frame is inputted to the coding unit 303 from the picture storage unit 301, and hence the coding unit 303 has heretofore been in the idling status during these frame periods. Such being the case, the drop-frame coding management unit 304 examines recoding of the coded frames by making use of these frame periods, and instructs the coding unit 303 to recode the coded frames (this process will hereinafter be referred to also as drop-frame coding).

The drop-frame coding management unit 304, when detecting an end of the idling time of the coding unit 303, specifies the should-be-outputted coded data and instructs the coded data delay buffer 306 to output the specified coded data. At this time, the drop-frame coding management unit 304 selects, based on the coding information stored in the coding information storage unit 305 and recoding scheme information, the coded data exhibiting the best coding performance in pieces of coded data about the target frames that are stored in the coded data delay buffer 306, as the coded data of that target frame.

Specifically, the drop-frame coding management unit 304, in the example in FIG. 10, when the frame P3 is inputted, detects the end of the idling time of the coding unit 303. At this time, the coded data delay buffer 306 stores the coded data of the frame I0 coded in the frame time of the frame I0 and with the coded data of the frame I0 recoded in the periods of frame time of the frames P1 and P2, respectively. The drop-frame coding management unit 304 specifies, based on the coding information, concerning these pieces of coded data, stored in the coding information storage unit 305 and on the recoding scheme information, the coded data exhibiting the best coding performance in pieces of coded data of the frame I0 that are stored in the coded data delay buffer 306, as the coded data of the frame I0.

Thus, the drop-frame coding management unit 304, each time detecting the end of the idling time of the coding unit 303, controls the coding unit 303 and the coded data delay buffer 306 to output any one piece of coded data about the coding target frame that is coded by the drop-frame processing in the just-anterior idling time. To be specific, the drop-frame coding management unit 304, in the example in FIG. 10, outputs one piece of coded data of the frame I0 by utilizing the frame time from the frame I0 up to the frame P3, outputs one piece of coded data of the frame P3 by utilizing the frame time from the frame P3 up to the frame P6, and outputs one piece of coded data of the frame P6 by utilizing the frame time from the frame P6 up to the frame P9.

<Coding Unit>

The coding unit 303 codes the frames normally in the sequence of the frames being transferred from the picture storage unit 301. The coding unit 303 transfers the coded picture data to the coded data delay buffer 306. The coding unit 303 determines the coding method corresponding to the picture type of the coding target frame. The second embodiment targets for the frame structure having only the I-picture and the P-pictures, and hence the coding unit 303 performs the coding by the intra-frame prediction or the coding by the forward prediction. Therefore, the coding unit 303 retains the frame inputted when the coding was previously done for a predetermined period for the P-picture.

Moreover, the coding unit 303 acquires coding information such as a generated code quantity, an average quantization value related to the frame from the coded data that has already been coded. The acquired coding information is stored in the coding information storage unit 305. Note that the coding information may contain other items of information serving as indices for coding in addition to the generated code quantity and the average quantization value.

The coding unit 303, in the case of receiving the recoding instruction from the drop-frame coding management unit 304, recodes the recoding-instructed frames retained when the coding was previously done. On the occasion of this recoding, the coding unit 303 remakes the coding scheme once again by use of the coding information on the target frame stored in the coding information storage unit 305. The coding unit 303 performs, based on this remade coding scheme, the code quantity control, the quantization control and so on, and recodes the target frame. With this coding scheme, scheme values such as a generated code quantity predictive value and an average quantization predictive value are determined. The re-determined recoding scheme information such as the generated code quantity predictive value and the average quantization predictive value, is stored together with the coding information in the coding information storage unit 305. It should be noted that this coding scheme itself may involve employing the generally known technology, and the present invention does not limit this coding scheme technique. The coding unit 303 transfers the recoded picture data to the coded data delay buffer 306.

<Coded Data Delay Buffer>

The coded data delay buffer 306 outputs the coded data, as it is, transferred from the coding unit 303 to other function units out of the moving picture coding device. If an output instruction is issued from the drop-frame coding management unit 304, the coded data delay buffer 306 outputs the coded data corresponding to this instruction.

[Operational Example]

Figure 6:
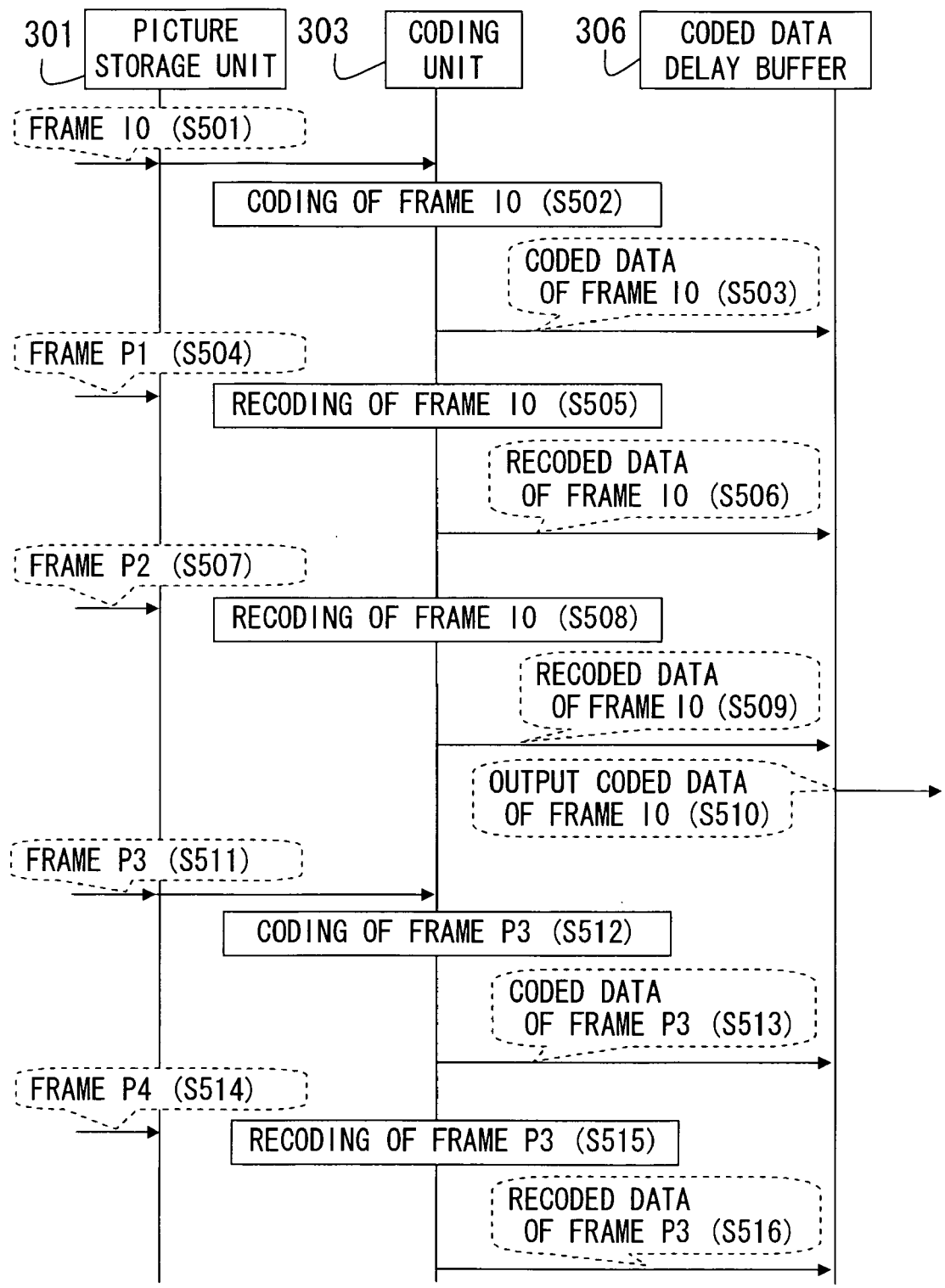
FIG. 6 is a diagram showing an operational example of the moving picture coding device in the second embodiment.

Next, an operational example of the moving picture coding device in the second embodiment will hereinafter be described with reference to FIG. 6. FIG. 6 is a flowchart showing the operational example of the moving picture coding device in the second embodiment, wherein the operational example is given in the case of inputting the picture signals shown in FIG. 10.

The picture signals inputted to the picture storage unit 301 are subjected to the drop-frame processing at a predetermined frame rate by the picture drop-frame unit 302 each time. The undropped frames are sequentially transferred to the coding unit 303. At first, the frame I0 is inputted to the picture storage unit 301 (S501). The frame I0 is not dropped by the picture drop-frame unit 302 and is therefore transferred as it is to the coding unit 303.

The coding unit 303, when receiving the frame I0, codes the frame I0 by the intra-frame prediction, corresponding to its picture type (S502). The coding unit 303 acquires the coding information from the coded data of the frame I0. The coding information on the coding of this frame I0 is stored in the coding information storage unit 305. The coded data of the frame I0 is transferred to the coded data delay buffer 306 (S503) and is stored in this buffer 306.

Subsequent to the frame I0, the frame P1 is inputted to the picture storage unit 301 in the next frame time (S504). The frame P1 is, however, dropped by the picture drop-frame unit 302. The drop-frame coding management unit 304, when judging, from the drop-frame information of which the picture drop-frame unit 302 has notified, that the frame time of this frame P1 is the idling time of the coding unit 303, instructs the coding unit 303 to execute the drop-frame coding.

The coding unit 303 recodes the frame I0 on the basis of the drop-frame coding instruction given from the drop-frame coding management unit 304 (S505). At this time, the coding unit 303 remakes the coding scheme by use of the coding information of the frame I0 that has been stored in the coding information storage unit 305 when the coding was done last time. With this recoding scheme, the coding unit 303 generates re-scheming information such as the generated code quantity predictive value and the average quantization predictive value. These pieces of re-scheming information is stored in the coding information storage unit 305. The coding unit 303 recodes the frame I0 on the basis of the re-scheming information.

The coding unit 303 acquires the coding information from the recoded data of the frame I0, and again stores the coding information in the coding information storage unit 305. The recoded data of the frame I0 is transferred to the coded data delay buffer 306 (S506).

Subsequent to the frame P1, the frame P2 is inputted to the picture storage unit 301 in the next frame time (S507). The frame P2 is, however, dropped by the picture drop-frame unit 302. The drop-frame coding management unit 304, when judging that the frame time of this frame P2 is the idling time of the coding unit 303, instructs the coding unit 303 to execute the drop-frame coding.

The coding unit 303 recodes the frame I0 on the basis of the drop-frame coding instruction (S508). This recoding process is the same as the process when the recoding has been done previously (S505). In this recoding, the coding scheme is again modified, and hence it is normally presumed that the coding exhibiting better performance than when the recoding has previously been executed (S505). The re-scheming information generated by this once-more coding scheme is also stored in the coding information storage unit 305.

Herein, the drop-frame coding management unit 304, upon detecting the end of the idling period of the coding unit 303, instructs the coded data delay buffer 306 to output the coded data exhibiting the best performance in pieces of coded data about the frame I0 that are stored in the coded data delay buffer 306. With this instruction, the output-instructed coded data about the frame I0 is outputted to other function units (S510).

Subsequent to the frame P2, the frame P3 is inputted to the picture storage unit 301 in the next frame time (S511). The frame P3 is not dropped by the picture drop-frame unit 302 and is therefore transferred as it is to the coding unit 303. The coding unit 303 codes the frame P3 (S512). This recoding process is the same as the coding (S502) of the previous frame I0. The coded data about the coded frame P3 is stored in the coded data delay buffer 306 (S513).

When the frame P4 is inputted next to the picture storage unit 301 (S514), the operation of each function unit is the same as the previous drop-frame coding (recoding) process (S505 through S510). Namely, it is judged that the frame time for which to input the frame P4 is the idling time of the coding unit 303, and the drop-frame coding is conducted.

[Operation/Effect]

Herein, an operation and an effect of the moving picture coding device in the second embodiment discussed above will be stated.

In the moving picture coding device in the second embodiment, the idling time of the coding unit 303 based on the drop-frame control is utilized, and the frame already coded before is recoded (the drop-frame coding). In this drop-frame coding, the recoding scheme is worked out based on the coding information acquired from the coded data when the coding was done previously, and the target frame is recoded based on this remade coding scheme.

With this coding scheme, the recoding scheme information such as the generated code quantity predictive value and the average quantization predictive value is generated and is stored together with the coding information. The recoded picture data is stored in the coded data delay buffer 306 each time.

The drop-frame coding management unit 304, when detecting the end of the idling time of the coding unit 303 based on the drop-frame control, outputs the coded data, judged to have the best performance, of the target frame in pieces of coded data stored in the coded data delay buffer 306. At this time, the drop-frame coding management unit 304 compares the post-actual-coding coding information with the stored recoding scheme, thereby judging the frame coded at the best performance.

Thus, in the second embodiment, the frame time for which to drop the frames under the drop-frame control is utilized, and the already-coded frame is recoded. After the coding, the coding information on the coded data is stored each time, and, when recoded, the coding scheme is remade based on the stored coding information.

Accordingly, the drop-frame coding system also utilizes the idling time of the coding unit, and the coding is repeated while the coding scheme is modified each time so as to increase the coding efficiency, thereby enabling the high-efficiency coding to be actualized by increasing the operating efficiency of the coding unit without enhancing the performance of the coding unit itself.

[Modified Example]

In the moving picture coding device in the second embodiment discussed above, each time the end of the idling time of the coding unit 303 is detected, there is outputted any one piece of coded data about the coding target frame already subjected to the drop-frame coding in the just-anterior idling time. As to this control, the drop-frame coding management unit 304 may, when detecting the end of the idling time of the coding unit 303, control the coding unit 303 and the coded data delay buffer 306 to further recode the coded data about the coding target frame already subjected to the drop-frame coding in the idling time before the idling time was once terminated.

Figure 7:
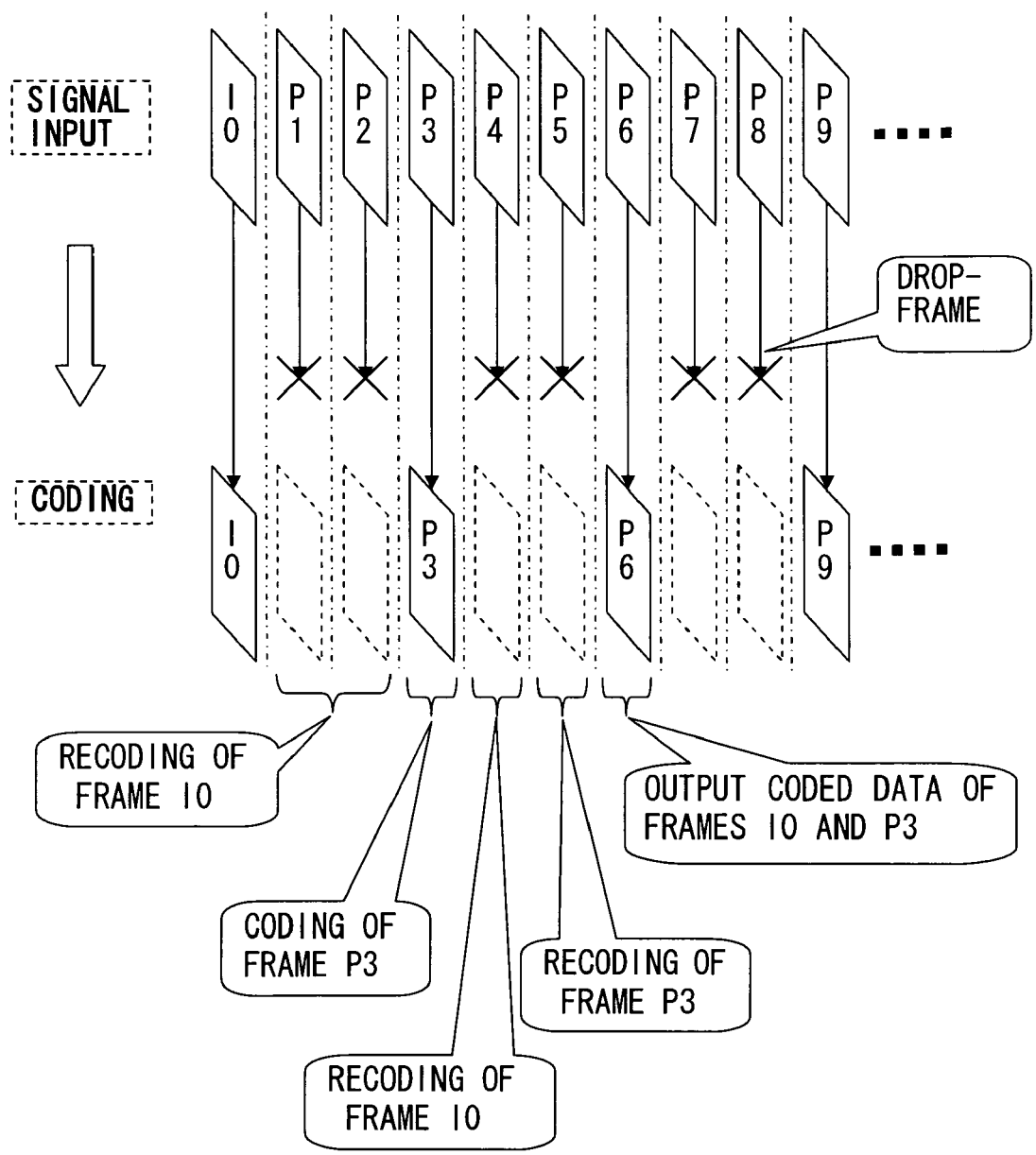
FIG. 7 is a diagram showing a modified example of the second embodiment.
Figure 8:
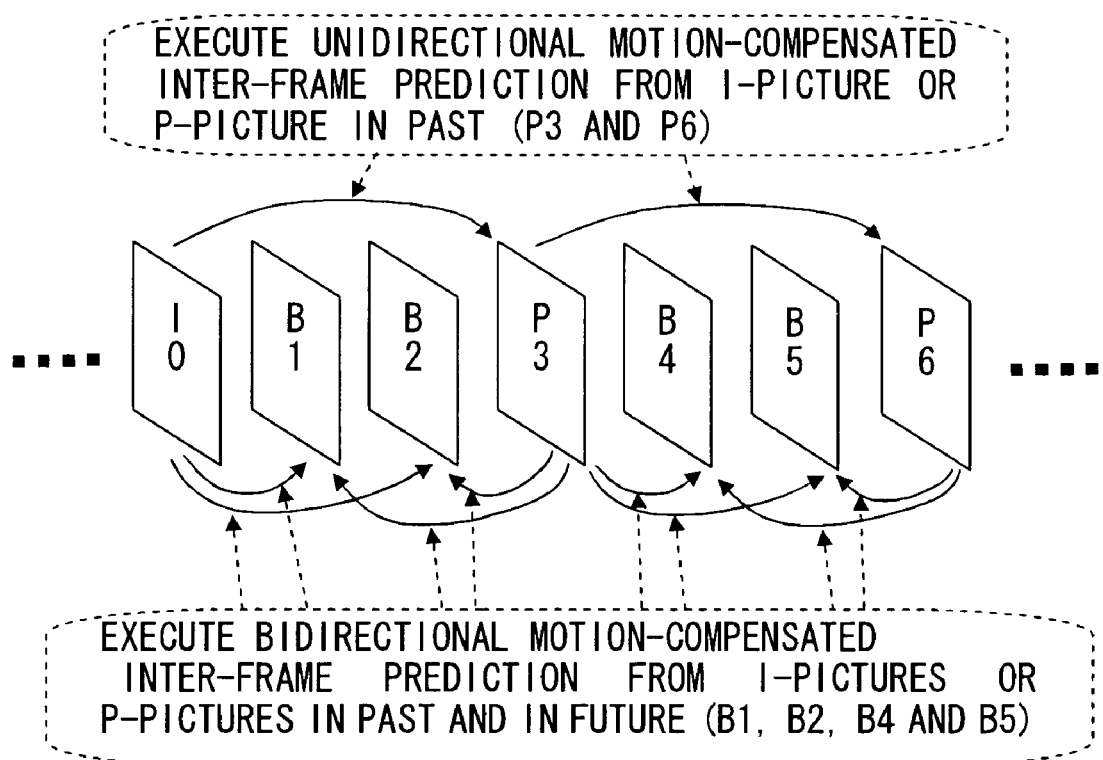
FIG. 8 is a diagram showing an MPEG-based frame structure.

A modified example of this drop-frame coding will be explained with reference to FIG. 7. FIG. 7 is a diagram showing the modified example of the moving picture coding device in the second embodiment.

The drop-frame coding management unit 304, even when the frame P3 is inputted and when detecting the end of the idling time of the coding unit 303, does not give the coded data output instruction to the coded data delay buffer 306. Eventually, the frame P3 is coded and is stored in the coded data delay buffer 306. Hence, at this time, the coded data delay buffer 306 stores the coded data of the frame I0 coded in the frame time of the frame I0, with the coded data of the frame I0 recoded in the periods of frame time of the frames P1 and P2 and with the coded data of the frame P3, respectively.

The drop-frame coding management unit 304, when the frame P4 is inputted and when detecting the idling time of the coding unit 303, examines the frame that should be recoded. Namely, the drop-frame coding management unit 304, when judging that the coded data of the frame P3, which is stored in the coded data delay buffer 306, does not have a desired coding quality, judges that the frame I0 should be recoded. With this operation, it follows that the coded data delay buffer 306 further stores the recoded data of the frame I0. Subsequently, the drop-frame coding management unit 304, when the frame P5 is inputted and when detecting the idling time of the coding unit 303, instructs the coding unit 303 to recode the frame P3.

Finally, when the frame P6 is inputted and when detecting the end of the idling time of the coding unit 303, the drop-frame coding management unit 304 hereat instructs the coded data delay buffer 306 to output, with respect to each frame, piece by piece the coded data having the desired coding quality in pieces of coded data of the frames I0 and P3 that are stored in the coded data delay buffer 306.

Thus, the frame P3 is coded by the forward prediction according to its picture type, and hence there is a case in which a result of coding the frame P3 might differ depending on the coding information of the frame in the past. In such a case also, in the moving picture coding device, the recoding is executed by use of the idling time of the coding unit 303, so that the high-efficiency coding can be actualized without enhancing the performance of the coding unit 303 itself.

<Others>

The disclosures of Japanese patent application No. JP2005-362140, filed on Dec. 15, 2005 including the specification, drawings and abstract are incorporated herein by reference.

What is claimed is:

1. A moving picture coding device coding picture frames each having any one of a plurality of picture types and inputted sequentially at a predetermined frame interval, comprising:

a pre-processing unit sequentially outputting, as a coding target frame, each of the picture frames sequentially inputted;

a coding unit coding the sequentially outputted coding target frame by a predictive coding method corresponding to a picture type of the coding target frame on the basis of a coding scheme corresponding to the coding target frame;

a control unit controlling, when detecting a frame interval at which the coding target frame is not outputted from the pre-processing unit, the coding unit to code a predetermined picture frame; and a modifying unit acquiring coding information from coded data coded by the control of the control unit, and modifying the coding scheme corresponding to the coding target frame from the coding information.

2. A moving picture coding device coding picture frames each having any one of a plurality of picture types and inputted sequentially at a predetermined frame interval, comprising:

a pre-processing unit sequentially outputting, as a coding target frame, each of the sequentially inputted picture frames in the output sequence corresponding to a picture type of each of the picture frames;

a coding unit coding the sequentially outputted coding target frame by a predictive coding method corresponding to a picture type of the coding target frame on the basis of a coding scheme corresponding to the coding target frame;

an instructing unit instructing, when detecting the frame interval at which the coding target frame is not outputted from the pre-processing unit, the pre-processing unit to output the same precedence picture frame as the picture frame already inputted to the pre-processing unit and waiting for its turn in the output sequence;

a control unit controlling, when the precedence picture frame is outputted, the coding unit to code the precedence picture fame by a predetermined predictive coding method; and a modifying unit acquiring coding information from coded data of the coded precedence picture frame, and modifying the coding scheme corresponding to the coding target frame from the coding information.

3. A moving picture coding device according to claim 2, wherein the control unit determines the predetermined predictive coding method, if one other precedence picture frame was previously coded by the coding unit, as forward interframe prediction coding that refers to this one other precedence frame, and determines the predetermined predictive coding method, if this one other precedence picture frame was not coded previously, as intra-frame prediction coding.

4. A moving picture coding device according to claim 2, wherein the modifying unit generates, based on the coding information, predictive coding information predicted to be acquired from the coded data of the coding target frame, and modifies the coding scheme on the basis of the generated predictive coding information.

5. A moving picture coding device coding picture frames each having any one of a plurality of picture types and inputted sequentially at a predetermined frame interval, comprising:

a pre-processing unit thinning out sequentially inputted picture frames at predetermined thin-out rate, and sequentially outputting each of the unremoved picture frames as a coding target frame;

a coding unit coding the sequentially outputted coding target frame by a predictive coding method corresponding to a picture type of the coding target frame on the basis of a coding scheme corresponding to the coding target frame;

a control unit controlling, when detecting a frame interval at which the coding target frame is not outputted from the pre-processing unit, the coding unit to recode the coding target frame already coded by the coding unit; and a modifying unit acquiring coding information from coded data of the coded and/or recoded coding target frame, and modifying the coding scheme corresponding to the coding target frame from the coding information.

6. A moving picture coding device according to claim 5, wherein the control unit calculates a recoding count on the basis of the thin-out rate, and controls the coding unit to execute the recoding a number of times corresponding to the calculated recoding count.

7. A moving picture coding device according to claim 5, further comprising:

a storage unit storing the coded data coded by coding unit and coded data recoded by the control of the control unit; and a selecting unit selecting any one piece of coded data about the same coding target frame stored in the storage unit.

8. A moving picture coding device according to claim 7, wherein the selecting unit selects the coded data of a high coding efficiency and/or a high coding quality on the basis of the coding information.

9. A moving picture coding device according to claim 5, wherein the control unit determines, based on the coding information, the picture frame that should be recoded in the coding target frames that have been already coded by the coding unit.

* * * * *